United States Patent
Takeda et al.

(10) Patent No.: US 6,247,538 B1
(45) Date of Patent: Jun. 19, 2001

(54) AUTOMATIC EXCAVATOR, AUTOMATIC EXCAVATION METHOD AND AUTOMATIC LOADING METHOD

(75) Inventors: Shu Takeda; Masanori Tojima; Tomonori Ozaki, all of Kawasaki; Megumi Hiyoshi, Hiratsuka, all of (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/254,660

(22) PCT Filed: Sep. 12, 1997

(86) PCT No.: PCT/JP97/03238

§ 371 Date: May 11, 1999

§ 102(e) Date: May 11, 1999

(87) PCT Pub. No.: WO98/11305

PCT Pub. Date: Mar. 19, 1998

(30) Foreign Application Priority Data

Sep. 13, 1996  (JP) ................................................ 8-243737

(51) Int. Cl.⁷ ................................. E21B 21/06; E02F 9/20
(52) U.S. Cl. ..................................... 172/2; 37/348
(58) Field of Search .................. 172/2, 3, 4, 4.5, 172/7, 5; 37/348; 342/22; 414/694; 73/866.5; 701/50

(56) References Cited

U.S. PATENT DOCUMENTS

| | | | | |
|---|---|---|---|---|
| 4,482,960 | * | 11/1984 | Pryor | 364/424 |
| 4,769,700 | * | 9/1988 | Pryor | 358/107 |
| 5,065,326 | * | 11/1991 | Sahm | 364/424.07 |
| 5,404,661 | * | 4/1995 | Sahm et al. | 37/348 |

* cited by examiner

Primary Examiner—Robert E. Pezzuto
(74) Attorney, Agent, or Firm—Diller, Ramik & Wight

(57) ABSTRACT

An automatic excavator for automatically excavating an excavation object and loading a loading object with the result excavation by utilizing a measuring instrument for determining the distance between the excavator and the excavation object and the loading object, an excavation object recognition system for recognizing a three-dimensional shape of the excavation object on the basis of an output from the measuring instrument, a target excavation position computing system for computing the target excavation position on the basis of the three-dimensional shape of the recognized excavation object, a target loading position computing system for computing a relative position of the loading object with respect to the excavator and a relative attitude of the excavator with respect to the loading object on the basis of an output from the measuring instrument, and computing a target loading position on the basis of the computed relative position, an automatic positioning system for automatically positioning the excavator in the computed target excavation position and the target loading position, an automatic excavation control system for automatically excavating the excavation object in the target excavation position, and an automatic loading control system for automatically loading the loading object with the excavation in the target loading position, whereby a series of operations from evacuation to loading can be carried out automatically and efficiently by using one automatic excavator.

5 Claims, 8 Drawing Sheets

AUTOMATIC EXCAVATOR, AUTOMATIC EXCAVATION METHOD AND AUTOMATIC LOADING METHOD

TECHNICAL FIELD

The present invention relates to an automatic excavating and loading technology for automatically carrying out a series of processes for excavating excavation object, and loading a loading object with the resultant excavation.

BACKGROUND ART

An automation technology for excavating and loading has been adopted to such an artificial system environment as an asphalt plant. In this system, guide path wires are underlaid between a material storage yard to a hopper, and the materials in the material storage yard are loaded onto the hopper by moving such an automatic excavating machines as a power shovel and a wheel loader along these guide path wires.

The guiding system using guide path wires laid like this, however, is only suitable for a stationary type system in which a material storage yard, a hopper, etc. are installed at fixed positions, but cannot be used for a site where the working position constantly changes, such as a civil engineering work site which includes a rock crushing site, mine and land development. In such a civil engineering work site, loading objects are normally not a stationary type, such as a hopper, but are a mobile type, such as a dump truck, and in this case, because the dump truck does not always remain in the same position, a function to automatically recognize the position of the dump truck is necessary.

A conventional automatic excavating and loading technology which has been applied to a civil engineering work site in a natural environment, including an excavating site, mine and land development, is disclosed in Japanese Patent Laid Open No. 5-297942.

In this conventional art, a current position of a crawler dump truck is computed in real-time, by a bi-directional tracking system comprising an automatic tracking unit disposed at the crawler dump truck and an automatic tracking unit disposed at a fixed station, and by a coordinate position computing system disposed at the crawler dump truck. The crawler dump truck automatically travels along the traveling path while comparing this computed current position with the traveling path coordinates which are set such that the loading position (excavating position) and the unloading position are connected. At the loading position (excavating position) where earth is loaded using a power shovel, the shape of excavation object for loading is measured by an ultrasonic sensor installed on the power shovel, and the working pattern of the power shovel is determined based on this, so that the excavation object is automatically loaded onto the crawler dump truck without any human operators.

In this conventional art, where the shape of excavation object is recognized by an ultrasonic sensor, the shape of excavation object, which is the object of excavation, cannot be accurately measured since the ultrasonic sensor can only measure a distance to one point. Also, an ultrasonic sensor, which can measure only a short distance, cannot be used for an excavation and loading operation where the moving range is large.

Also in this conventional art, a position of the mobile type loading object (in this case, a crawler dump truck) and a relative attitude of the excavator (in this case, a power shovel) with respect to the loading object, are not detected. Therefore, the position of the loading object and the relative attitude of the excavator with respect to the loading object cannot always be detected accurately at the excavator side. As a result, excavation object is frequently spilled, and in an extreme case, collision between the excavator and the loading object may occur.

With the foregoing in view, it is an object of the present invention to provide an automatic excavator which can carry out a series of operations, from excavation to loading, automatically and efficiently using one automatic machine.

It is another object of the present invention to provide an automatic excavator which can carry out an efficient excavation operation by increasing the amount of excavation object to be excavated at each excavation.

DISCLOSURE OF THE INVENTION

The present invention is an automatic excavator adapted to automatically carry out a series of processes for excavating an excavation object and loading a loading object with resultant excavation, comprising a measuring instrument for determining distances from the excavator to the excavation object and the loading object; excavation object recognition means for recognizing a three-dimensional shape of the excavation object on the basis of an output from the measuring instrument; target excavation position computing means for computing a target excavation position on the basis of the three-dimensional shape of the excavation object; target loading position computing means for computing a relative position of the loading object with respect to the excavator and a relative attitude of the excavator with respect to the loading object on the basis of an output from the measuring instrument, and computing a target loading position on the basis of the computed relative position; automatic positioning means for automatically positioning the excavator or a working machine in the computed target excavation position and target loading position; automatic excavation control means for automatically excavating the excavation object in the target excavation position; and automatic loading control means for automatically loading the loading object with the excavation in the target loading position.

According to such an invention, the excavator determines the target excavation position and the target loading position from the recognition result of excavation object and the loading object, and automatically carries out the excavation operation and the loading operation at the determined target excavation position and the target loading position, so that a series of operations from excavation to loading can be carried out automatically and efficiently using one automatic machine. Also in this invention, a three-dimensional shape of excavation object is measured and the target excavation position is determined on the basis of this shape data, so that the excavation operation can be carried out to an optimum excavation position and an efficient excavation operation can be implemented.

Also in the present invention, the automatic excavator adapted to automatically excavate excavation object comprises three-dimensional shape recognition means for recognizing a three-dimensional shape of the excavation object; identification means for identifying a protruding position of the excavation object on the basis of the recognized three-dimensional shape of the excavation object; and excavation means for automatically performing excavation regarding the identified protruding position of the excavation object as the target excavation position.

According to such an invention, a protruding position (tip of convex parts of the landform) of excavation object is identified on the basis of the recognized three-dimensional shape of the excavation object, and excavation is automatically carried out regarding the identified position as the target excavation position, therefore the amount of excavation each time can be increased and an efficient excavation operation can be implemented.

Also in the present invention, in the automatic excavation method for the excavator to automatically excavate excavation object, beacons indicating the range of the excavation of excavation object are disposed near the excavation object, and a visual sensor for picking up the image of the beacons is disposed at the excavator so that the excavator identifies the excavation range by processing the image data picked up by the visual sensor.

According to such an invention, the beacons indicating the range of the excavation of excavation object are disposed and the visual sensor disposed at the excavator side recognizes the beacons to identify the excavation range, therefore the excavation range can be identified without complicated and troublesome image processing, and a practical excavation system can be implemented at low cost.

Also in the present invention, in the automatic loading method for the loading machine to automatically load the loading object with object load, predetermined beacons are disposed at the loading object and a visual sensor for picking up images of the beacons is disposed at the loading machine, so that the relative position of the loading object with respect to the loading machine is computed by processing the image data picked up by this visual sensor, and the target loading position is determined on the basis of the computed relative position.

According to such an invention, beacons are disposed at the loading object and a visual sensor disposed at the loading machine recognizes the beacons so that the relative position of the loading object with respect to the loading machine is computed and the target loading position is determined on the basis of this computing result, therefore an accurate loading position is obtained at each loading even if the loading object is such a mobile type as a dump truck, and a highly efficient loading operation with little spill is implemented, and also when the loading object is such a mobile type as a dump truck, it is unnecessary to position the loading object very accurately.

BEST MODE FOR CARRYING OUT THE INVENTION

Embodiments of the present invention will now be described with reference to the accompanying drawings.

Figure 1:
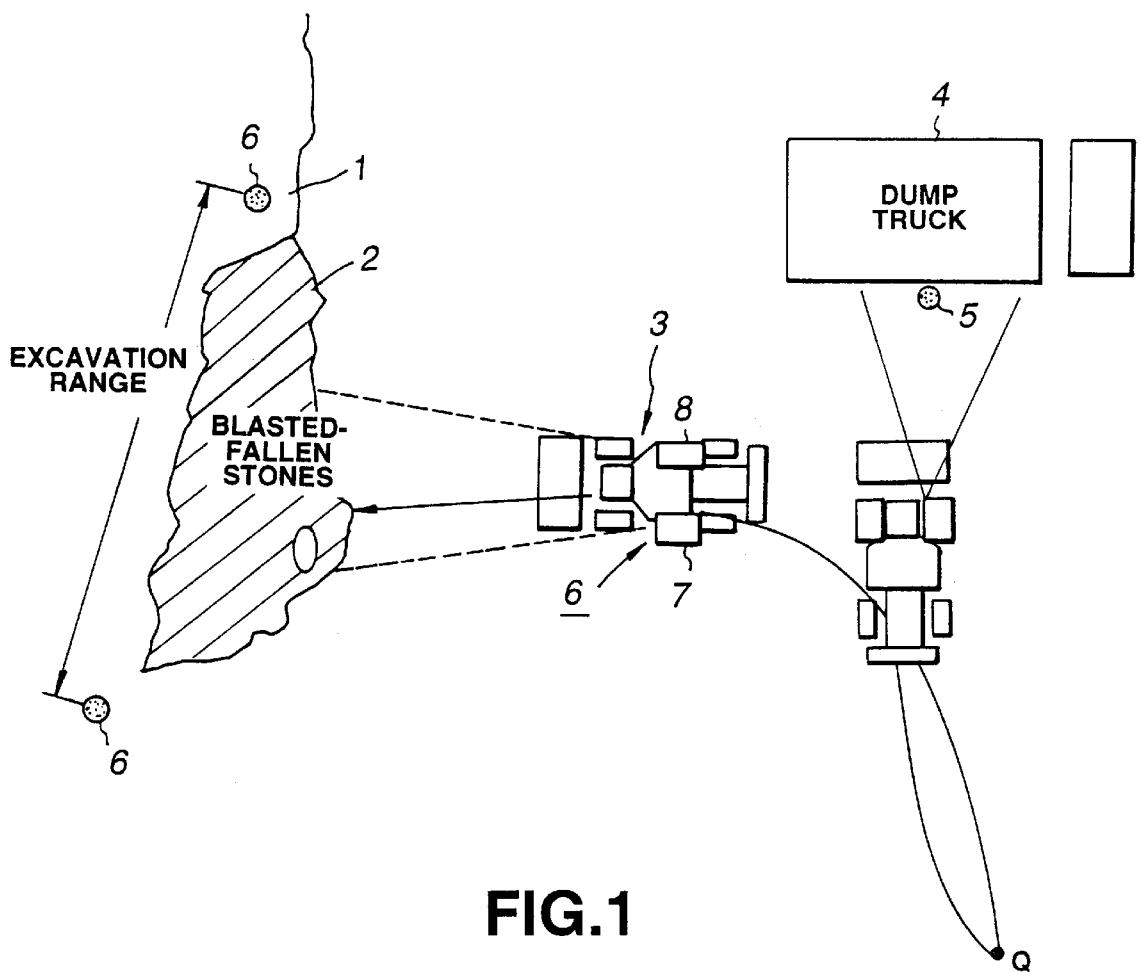
FIG. 1 is a schematic view depicting this invention applied to a site for excavating and loading blasted-fallen stones.

FIG. 1 is a view depicting the present invention applied to a civil engineering work site, such as a rock crushing site and mine.

On a rock surface 1, blasted-fallen stones 2 are accumulated, and this automatic system executes a series of operations starting from excavating of the accumulated-blasted-fallen stones 2 using such an excavator 3 as a wheel loader and power shovel to loading the dump truck 4 with the excavation.

The excavator 3 is equipped with a visual sensor 30 (in this case, two cameras 7 and 8) for recognizing overall three-dimensional shape (landform) of excavation object (in this case, blasted-fallen stones 2) and for measuring the distance and direction to the dump truck 4 (more precisely, to the beacon 5 disposed on the side of the dump truck), and this distance to the recognition target is measured by the stereo method utilizing parallax of the two cameras 7 and 8.

In the excavation site, two beacons 6 (something outstanding, such as red pylons) are disposed at both ends of the excavation range so that the visual sensor 30 can recognize the excavation range where the blasted-fallen stones 2 exist. In other words, the range of the blasted-fallen stones 2 after blasting must be recognized, and the beacons indicating the excavation range are artificially disposed in this embodiment since a method for identifying the blasted area and the non-blasted area by image processing on the basis of image data of the cameras is practically difficult. When red pylons are disposed, the pylons can be recognized by extracting red from the image data shot by the cameras.

Next, recognition processing of a recognition object by the stereo method using two cameras is described.

Figure 2:
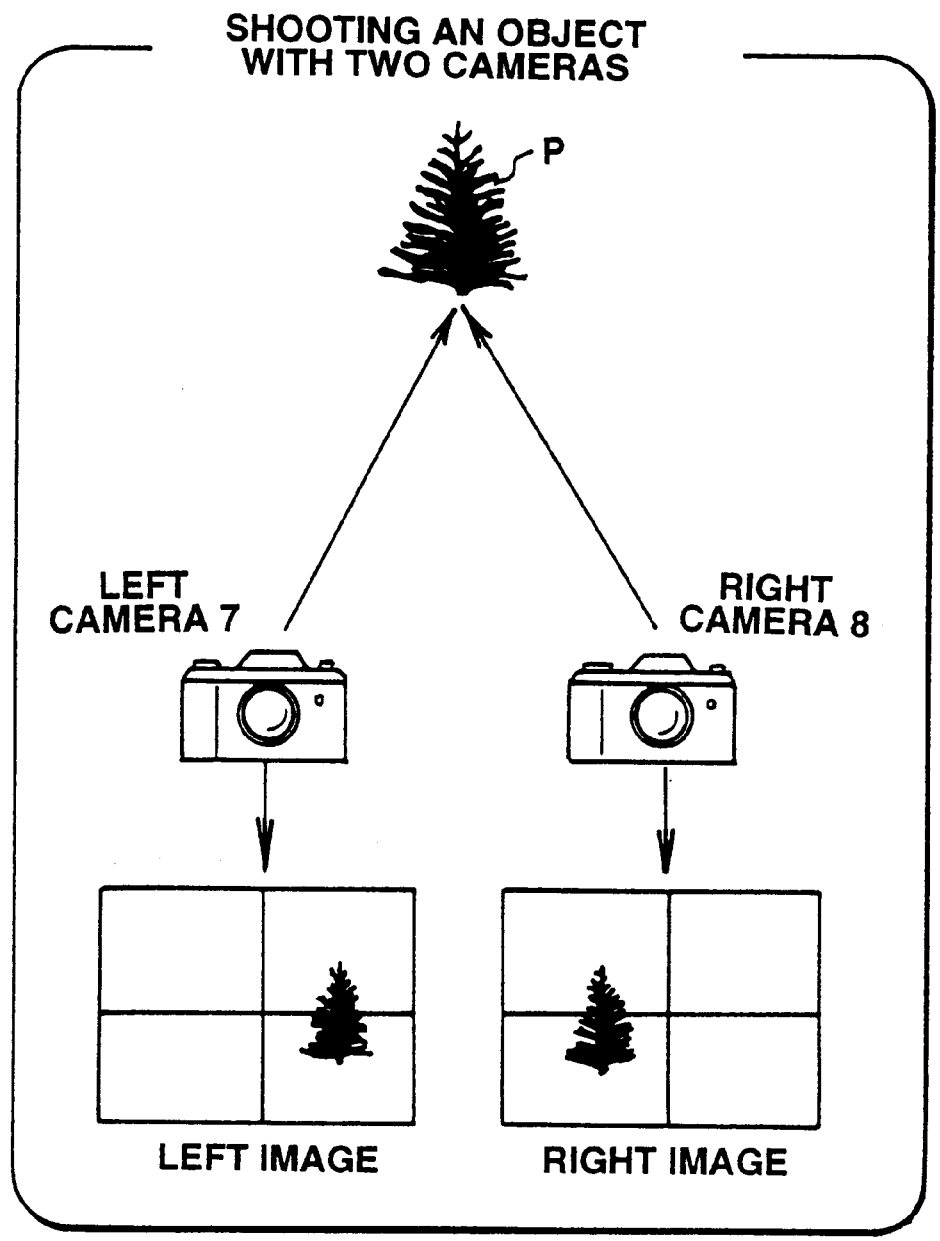
FIG. 2 illustrates the theory of the stereo method.

Specifically, when the recognition object P is shot by the two cameras separated from each other for a predetermined distance, as FIG. 2 shows, parallax is generated between the left image shot by the left camera 7 and the right image shot by the right camera 8. This parallax is in inverse proportion to the distance to the recognition object P, therefore the viewing position differs greater as the distance becomes shorter.

Figure 3:
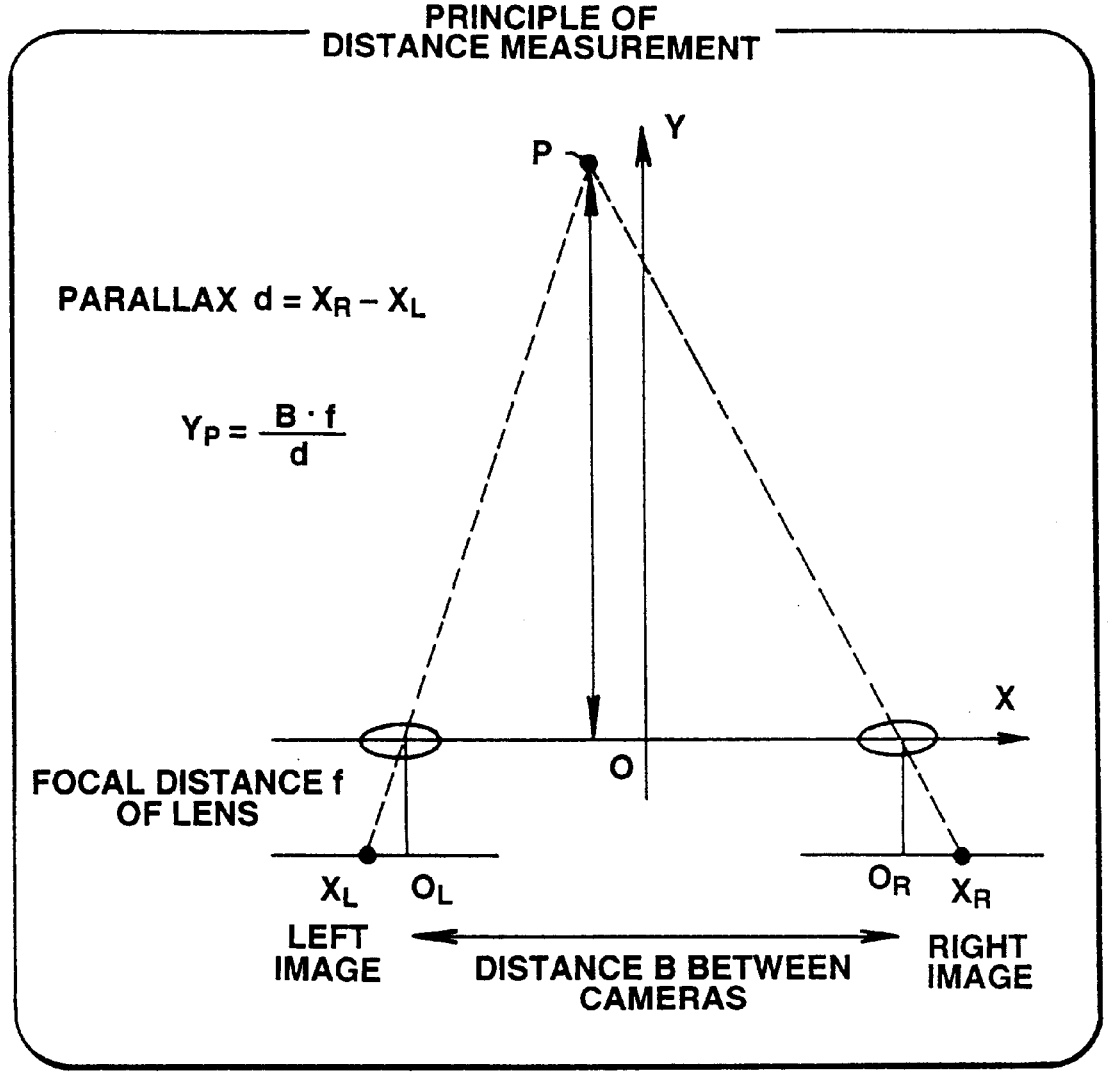
FIG. 3 illustrates the theory of distance measurement in accordance with the stereo method.

Specifically, supposing that the direction connecting the cameras 7 and 8 (normally the direction vertical to the moving direction of the excavator) is the X direction, the direction vertical to this X direction is the Y direction, a position in the X direction of the recognition object P on the image shot by the left camera 7 is XL, and a position in the X direction of the recognition object P on the image shot by the right camera 8 is XR, as FIG. 3 shows, then the difference XR−XL is parallax d. O is the center position between the left camera 7 and the right camera 8, OL is the center position of the image shot by the left camera 7, and OR is the center position of the image shot by the right camera 8.

Supposing that parallax is d, the distance between the cameras is P and the focal distance of the cameras is f, then Yp, which is the position of the recognition object P in the Y direction, can be given by the following formula.

$$Yp = B \cdot f/d \qquad (1)$$

The above is the principle of distance measurement by the stereo method.

Next, a method for recognizing the landform created by blasted-fallen stones 2 using the above stereo method is described.

Figure 4:
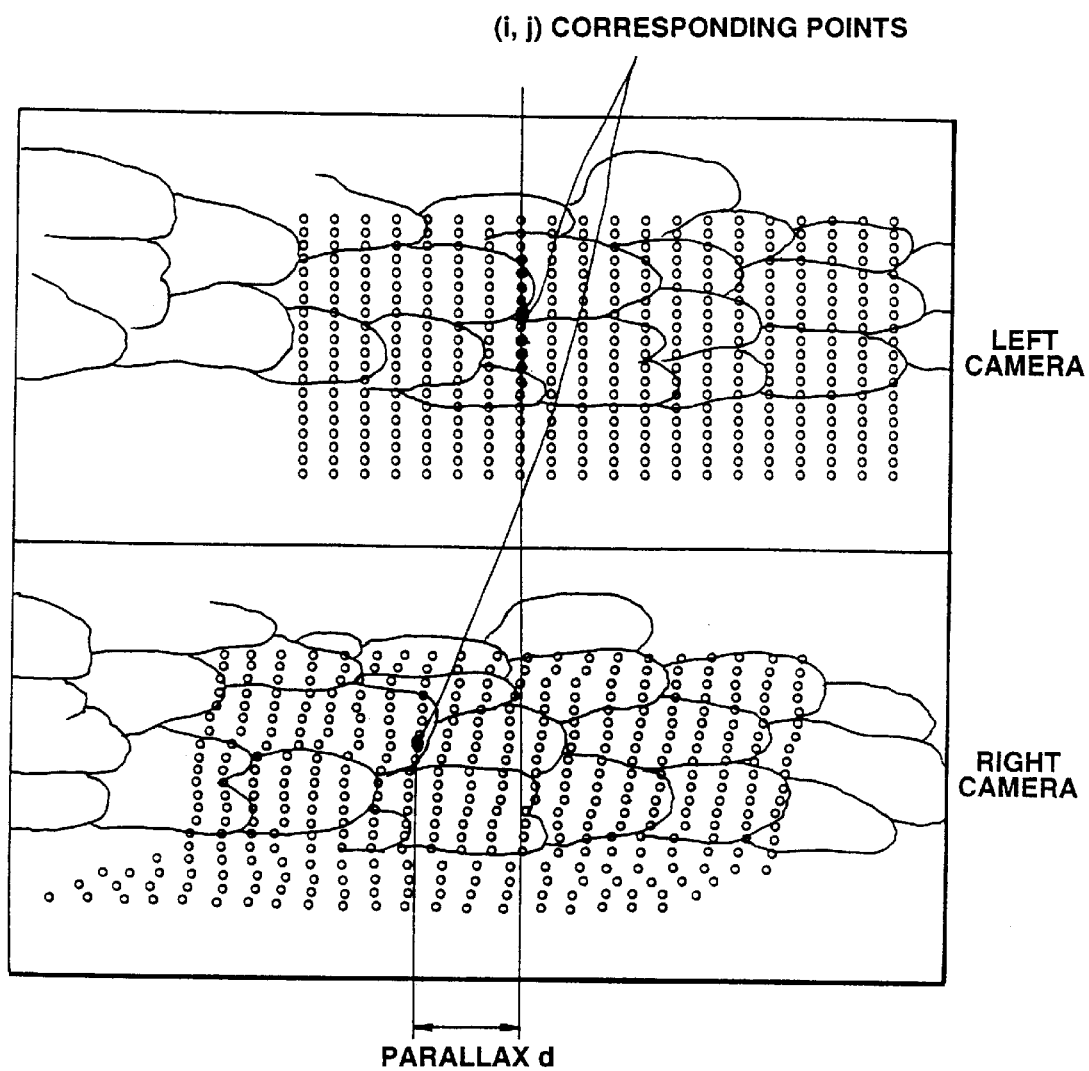
FIG. 4 illustrates a method for recognizing the three-dimensional shape of excavation object.

The upper half of FIG. 4 shows the landform created by blasted-fallen stones shot by the left camera 7, and the bottom half is the same landform shot by the right camera 8. In this case, the distance map of each point (i, j) of the left camera image, which is shown in the upper half, is to be determined.

At first, a plurality of point matrices (i, j) are set for the left camera image. In this case, $1 \leq i \leq 20$ and $1 \leq j \leq 20$. Then one point (i, j) of the left camera image and a corresponding point of the right camera image are searched using such a method as pattern matching. When the corresponding point is determined, the positions of both of these points are determined on the images, and the above-mentioned parallax d is determined. Then the determined value is substituted for d in the above formula (1), and the distance data from the point (i, j) to the excavator 3 is determined. The distance map is determined by repeatedly executing such processing for each point of $1 \leq i \leq 20$ and $1 \leq j \leq 20$.

Figure 5:
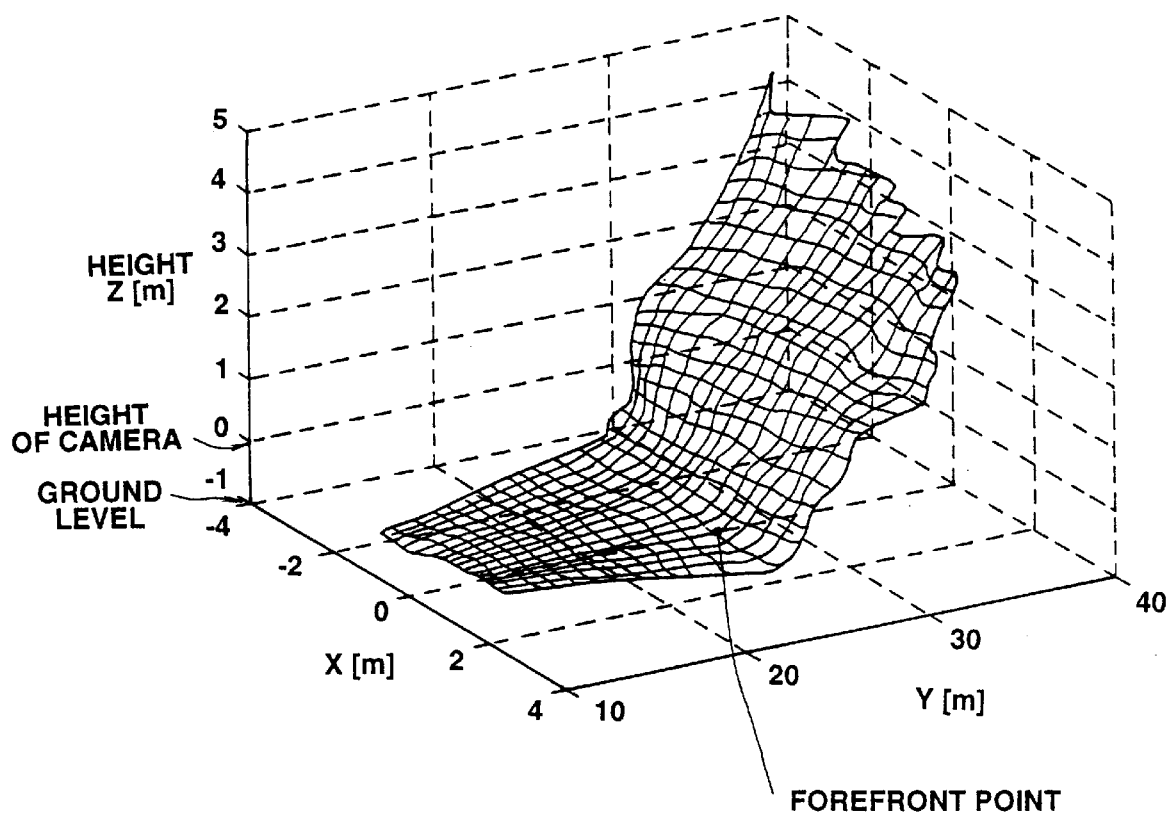
FIG. 5 is a view in which a three-dimensional recognition result of excavation object is plotted on the x, y and z axes.

FIG. 5 is a view plotting the distance map data (x, y, z) determined by the above method.

Figure 6:
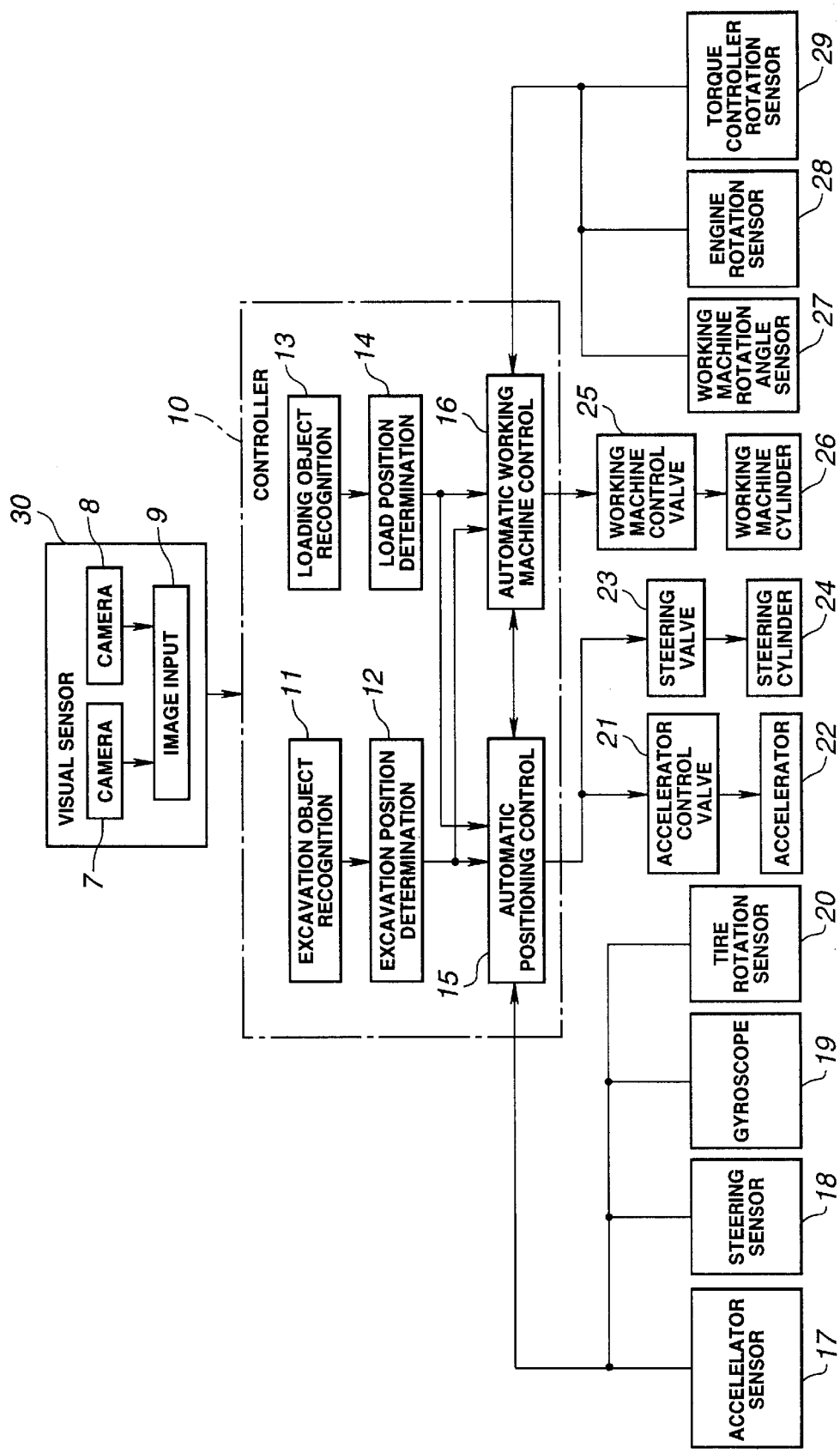
FIG. 6 is a block diagram depicting a configuration of the control system of the excavator.

Next, the internal configuration of the control system of the excavator 3 is described referring to FIG. 6.

The visual sensor 30, which comprises the two cameras 7 and 8, inputs image data by these cameras to the controller 10 via the image input section 9.

The excavation object position recognition section 11 determines the distance map data of the excavation object by the above-mentioned method on the basis of the image data shot by the two cameras 7 and 8 (see FIG. 5). Since the landform of excavation object changes each time excavation is carried out, the landform recognition by the excavation object position recognition section 11 is executed each time excavation is carried out, so that the amount of earth to be excavated each time can be increased and efficient excavation work can be implemented.

The excavation position determination section 12 determines which part of site should be excavated first so that a greater amount of earth can be excavated and efficient excavation can be carried out from the landform recognized by the excavation object position recognition section 11. In actual operations, the position of the forefront convex part (protruding position) of the pile is computed on the basis of the determined distance map data mentioned above, and this position is determined as the next excavation position.

In other words, the ground part for which height is lower than a predetermined height is excluded first from the distance map data in FIG. 5. In operations, the points where Z←H are excluded from the distance map data since the height H of the cameras 7 and 8 on the excavation is known.

Then, of all the remaining points, the point for which distance data y is the smallest is determined as the forefront point.

The loading object recognition section 13 recognizes the distance to the dump truck 4 stopped in the predetermined stopping range, the attitude of the dump truck 4, etc. on the basis of the image data shot by the cameras 7 and 8. In other words, it is impossible to always stop the dump truck 4 at the same position and in the same attitude, even if the stopping range is set. So in the case of FIG. 1, one beacon 5 is installed at the dump truck 4, the two cameras 7 and 8 shoot this beacon 5, and the distance to the beacon 5 is measured by the above-mentioned stereo method.

Figure 7:
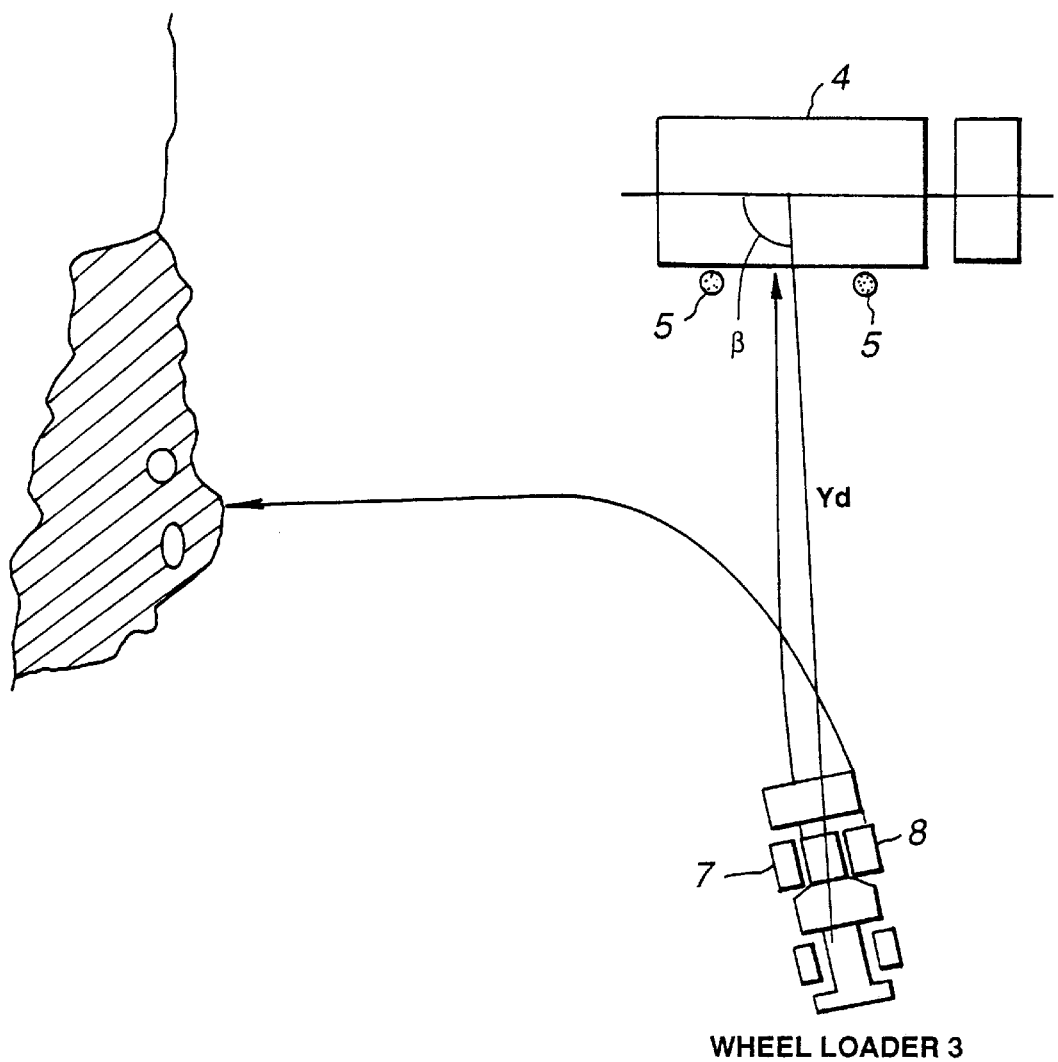
FIG. 7 is a view depicting the recognition manner of the loading object.

In FIG. 7, the two beacons 5 are disposed by the dump truck 4, and not only distance but the relative attitude p of the excavator 3 with respect to the dump truck 4 are determined. In other words, the distance yd to the two beacons 5 are computed respectively using the stereo method, and the position of each beacon in the shot image are determined so that the orientation of each beacon from the center axis of the camera is computed. Then using the orientation and distance of each beacon computed in this manner, distance to the dump truck 4 and relative attitude p of the excavator 3 with respect to the dump truck 4 are computed.

Then the loading position determination section 14 determines the actual loading position on the basis of the distance yd and relative attitude p of the dump truck determined by the loading object recognition section 13. If loading is performed from the wheel loader to the dump truck, for example, the approach distance is determined such that the center of the bucket of the loader is coincide with the center of the vessel of the dump truck while considering the reach of the loader.

Next, the automatic positioning control section 15 is described.

In this case, the automatic positioning control section 15 sequentially computes its current position during traveling using the dead reckoning method. Specifically, the automatic positioning control section 15 detects the azimuth of the excavator 3 from the output of the gyroscope, detects the travel distance from the output of the tire rotation sensor 20, and sequentially computes the current position of the excavator 3 by these detection outputs.

At the excavating operations, the automatic positioning control section 15 automatically travels to the target excavation position determined by the excavation position determination section 12. Specifically, the locus connecting the target excavation position and the current position are computed using a line, an arc, a curve of higher orders and non-linear curve, etc. so that smooth steering is carried out. Then, the target positions are obtained at every moment by specifying the speed pattern, and controls the accelerator 2 and steering cylinder 24 via the accelerator control value 21 and the steering valve 23 so that the excavator 3 travels passing through these plurality of target positions sequentially. For the accelerator control and the steering control, values detected by the accelerator sensor 17 and the steering sensor 18 are fed back so that automatic control to follow-up the command values is carried out.

At the loading operations, on the other hand, the automatic positioning control section 15 controls to travel to the target loading position determined by the loading position determination section 14, in the same manner as excavation.

Next, the automatic working machine control section 16 is described.

At the excavating operations, when the excavator reaches the target excavation position, the automatic working machine control section 16 executes automatic excavation by controlling the working machine cylinder 26 via the working machine control valve 25. In other words, the load is detected from the outputs of the engine rotation sensor 28 and the torque converter rotation sensor 19, and excavation is executed while driving the working machines such that load is released when load is too high. Also, the angle of each working machine is detected from the outputs of the working machine rotation angle sensor, and the working machines are driven according to the deviation from the target angle.

At the loading operation, when the target loading position is reached, the automatic working machine control section 16 executes automatic loading by controlling the working machine cylinder 26 via the working machine control valve 25. Unlike at excavation, the working machines can be controlled in a predetermined sequence at loading, therefore, the load operation is carried out such that the work machines move along the predetermined locus.

Figure 8:
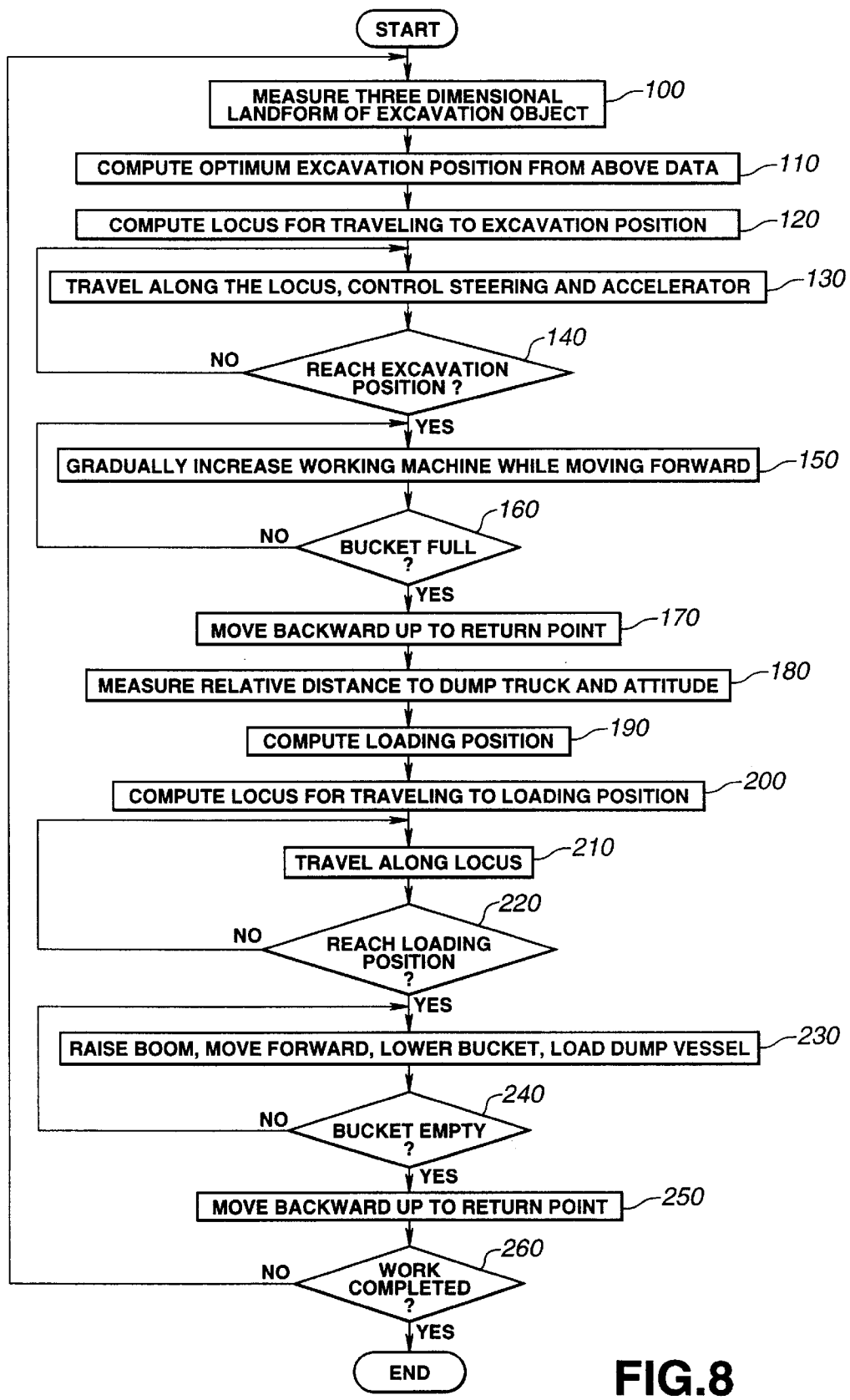
FIG. 8 is a flow chart indicating a series of process flow from excavation to loading in accordance with an embodiment of the present invention.

Next, a series of operations related to automatic excavation and loading are described with reference to FIG. 8. In this case, it is assumed that the excavator 3 is a wheel loader.

At first the excavator 3 shoots the area near the excavation range using the two cameras 7 and 8 at predetermined standby positions in front of the excavation range. The excavation object recognition section 11 of the controller 10 recognizes the three-dimensional landform of the excavation range by performing operation based on the above-mentioned stereo method on the image data shot by the cameras (Step 100). At this recognition, the range of landform recognition is selected by identifying the two beacons.

Then the excavation position determination section 12 computes the forefront part (protruding position) of the pile on the basis of the landform data recognized by the excavation object position recognition section 11, and determines this position as the position to excavate this time (Step 110).

The automatic positioning control section 15 computes the travel locus between the target excavation position determined by the excavation position determination section 12 and the current position (Step 120), and controls driving of the accelerator 22 and the steering 24 so as to follow-up this locus (Step 130).

When the excavator 3 reaches the target excavation position in this manner (Step 140), the automatic positioning control section 15 controls the excavator 1 to move forward, and the automatic working machine control section 16 controls the working machine cylinder 26 to gradually elevate the work machines, so that the excavation operation is automatically executed (Step 150).

When the bucket becomes full and the end of excavation is detected (Step 160), the automatic positioning control section 15 moves the excavator 3 backwards up to the return point Q between the locus for excavation and the locus for loading (see FIG. 1). During this backup, too, the locus for traveling between the excavation position and the preset return point Q is computed, and travel control is executed so as to follow-up this locus (Step 170).

When the excavator 3 reaches the return point Q, the two cameras 7 and 8 shoot the area near the loading position. The loading object recognition section 13 recognizes the beacon 5 disposed at the dump truck 4 from the image data shot by the cameras 7 and 8, and measures the distance to the dump truck 4 and the relative attitude of the excavator 3 with respect to the dump truck 4 on the basis of this recognition (Step 180).

Then the loading position determination section 14 determines the actual target loading position on the basis of the distance to the dump truck 4 and the relative attitude determined by the loading object recognition section 13 (Step 190).

Then the automatic positioning control section 15 computes the travel locus between the target loading position determined by the loading position determination section 14 and the current position (Step 200), and controls the driving of the accelerator 22 and the steering 24 so as to follow-up this locus (Step 210).

When the excavator 3 reaches the target loading position in this manner (Step 220), the automatic positioning control section 15 and the automatic working machine control section 16 moves [the excavator] forward while raising the boom according to a predetermined sequence, then executes the loading operation rotating the bucket out to the dump truck side (Step 230). As a result, the excavated blasted-fallen stones are loaded into the vessel of the dump truck.

When the bucket becomes empty and the end of loading is detected (Step 240), the automatic positioning control section 15 moves the excavator 3 backward up to the return point Q.

Then the above procedure is repeatedly executed until the excavation and loading operation ends (step 260). In other words, in this case the excavation area is shot each time excavation is executed to recognize the landform. The loading object is also shot each time loading is executed to measure the distance to the loading object and relative angle of the excavator with respect to the loading object. Therefore, in this case, the positioning accuracy of the excavator does not have to be very high.

In the above embodiment, the excavation object is recognized by the stereo method using two cameras, but the three-dimensional shape of excavation object may be measured by two-dimensional scanning of the distance sensors which measure distances by laser, ultrasonic, millimeter waves and other means.

Also in the above embodiment, the two cameras 7 and 8 are shared as visual recognition means for both excavation object and the loading object, but these visual recognition means may be separately provided.

Also in the above embodiment, the excavation range is identified by disposing two beacons near the rock surface to be excavated, but when a ditch or square concave area is excavated by a power shovel, beacons may be disposed at four corners so that the excavation range is identified by these beacons. In the case of a power shovel, which normally loads only by turning without traveling, the target turning angle and the working machine angle are computed from the determined target loading position for executing load processing.

Also in the above embodiment, the excavator automatically travels by the dead reckoning method, but the absolute position of the excavator may be measured by GPSs.

Also in the above embodiment, such a mobile type as a dump truck is assumed as a loading object, and the distance and the relative attitude of the loading object shot by the cameras 7 and 8 are measured, but the above measurement control may be applied when the loading object is such a fixed type as a hopper. It is also acceptable that GPSs be disposed at the excavator and the loading object, and the distance and relative attitude of the loading object are measured from the absolute positions of the excavator and the loading object measured by these GPSs.

It is also acceptable that the shape of the load in the vessel is recognized on the basis of the image data shot by the cameras at loading, and the load position is determined on the basis of this shape recognition so that the load does not spill from the vessel.

INDUSTRIAL APPLICABILITY

With this invention, a series of operations from excavation to loading can be automatically and efficiently carried out using one automatic machine.

What is claimed is:

1. An automatic excavator adapted to automatically carry out a series of processes for excavating an excavation object and loading a loading object with resultant excavation, comprising:

a measuring instrument for determining distances from the excavator to the excavation object and the loading object;

excavation object recognition means for recognizing a three-dimensional shape of the excavation object on the basis of an output from the measuring instrument;

target excavation position computing means for identifying a point having the smallest distance from the excavator in the excavation object of the three-dimensional shape from which portions below the ground level are excluded as a protruding position, and determining the protruding position as a target excavation position;

target loading position computing means for computing a relative position of the loading object with respect to the excavator and a relative attitude of the excavator with respect to the loading object on the basis of an output from the measuring instrument, and computing a target loading position on the basis of the computed relative position;

automatic positioning means for automatically positioning the excavator or a working machine in the computed target excavation position and target loading position;

automatic excavation control means for automatically excavating the excavation object in the target position; and automatic loading control means for automatically loading the loading object with the excavation in the target loading position.

2. The automatic excavator according to claim 1, wherein the measuring instrument is at least two cameras disposed with a predetermined distance apart from each other.

3. An automatic excavator adapted to automatically excavate a cone-shaped excavation object comprising:

an excavator measuring means for determining a distance from the excavator to the excavation object;

excavation object recognition means for recognizing a three-dimensional shape of the excavation object on the basis of an output from the measuring means;

protruding position detecting means for detecting a point having the smallest distance from the excavator in the excavation object of the three-dimensional shape from which portions below ground level are excluded as a protruding position; and excavating means for automatically excavating by determining the protruding position as a target excavation position.

4. The automatic excavator according to claim 3, wherein the excavation object recognition means executes three-dimensional shape recognition processing for the excavation object at each excavation.

5. The automatic excavator according to claim 3, wherein the measuring instrument is at least two cameras disposed with a predetermined distance apart from each other.

* * * * *